United States Patent
Choi et al.

(10) Patent No.: US 10,224,987 B2
(45) Date of Patent: Mar. 5, 2019

(54) METHOD AND APPARATUS FOR CONFIGURING SIGNAL FIELD USED FOR MULTIPLE RESOURCE UNITS IN WIRELESS LAN SYSTEM

(71) Applicant: LG ELECTRONICS INC., Seoul (KR)

(72) Inventors: Jinsoo Choi, Seoul (KR); Hangyu Cho, Seoul (KR); Wookbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/566,207

(22) PCT Filed: Apr. 14, 2016

(86) PCT No.: PCT/KR2016/003875
§ 371 (c)(1),
(2) Date: Oct. 12, 2017

(87) PCT Pub. No.: WO2016/167561
PCT Pub. Date: Oct. 20, 2016

(65) Prior Publication Data
US 2018/0109300 A1 Apr. 19, 2018

Related U.S. Application Data

(60) Provisional application No. 62/146,986, filed on Apr. 14, 2015, provisional application No. 62/147,607, (Continued)

(51) Int. Cl.
*H04K 1/10* (2006.01)
*H04L 27/28* (2006.01)
(Continued)

(52) U.S. Cl.
CPC ......... *H04B 7/0452* (2013.01); *H04L 5/0007* (2013.01); *H04L 5/0094* (2013.01);
(Continued)

(58) Field of Classification Search
CPC .... H04B 7/0452; H04W 84/12; H04L 5/0007; H04L 27/32; H04L 5/0044
(Continued)

(56) References Cited

U.S. PATENT DOCUMENTS

2013/0286959 A1    10/2013    Lou et al.
2014/0211775 A1    7/2014    Sampath et al.
(Continued)

OTHER PUBLICATIONS

Kwon, et al., "SIG Field Design Principle for 11ax", doc.: IEEE 802.11-15/0344r2, Mar. 2015, 20 pages.
(Continued)

*Primary Examiner* — Phuong Phu
(74) *Attorney, Agent, or Firm* — Lee, Hong, Degerman, Kang & Waimey

(57) ABSTRACT

The present specification suggests a method and an apparatus regarding first and/or second signal fields used in a wireless LAN system. When multiple resource units are used for a specific band, a bit map field may be configured first by a resource unit having a first size, and for the remaining bands, allocation information may be configured by a resource unit having a second size. Also, a bit map field which indicates whether MU-MIMO technique is applied to the specific band or not can be further included. For example, the resource unit having the first size may comprise 242-RU and the resource unit having the second size may comprise 26-RU. A specific resource unit to which the MU-MIMO technique is applied may be 106-RU or more.
(Continued)

When discontinuous channel bonding is an issue, additional changes can be made to the first/second signal fields of the present specification.

7 Claims, 12 Drawing Sheets

Related U.S. Application Data filed on Apr. 15, 2015, provisional application No. 62/148,751, filed on Apr. 17, 2015, provisional application No. 62/152,041, filed on Apr. 24, 2015, provisional application No. 62/154,129, filed on Apr. 29, 2015.

(51) Int. Cl.
*H04B 7/0452* (2017.01)
*H04L 5/00* (2006.01)
*H04L 27/32* (2006.01)
*H04L 27/26* (2006.01)
*H04W 84/12* (2009.01)

(52) U.S. Cl.
CPC .......... *H04L 27/2602* (2013.01); *H04L 27/32* (2013.01); *H04W 84/12* (2013.01)

(58) Field of Classification Search
USPC ................................ 375/260, 259, 261, 295
See application file for complete search history.

(56) References Cited

U.S. PATENT DOCUMENTS

| 2014/0307650 | A1* | 10/2014 | Vermani | ............... H04L 5/0044 |
| | | | | 370/329 |
| 2014/0369276 | A1 | 12/2014 | Porat et al. | |
| 2015/0009894 | A1 | 1/2015 | Vermani et al. | |

OTHER PUBLICATIONS

PCT International Application No. PCT/KR2016/003875, Written Opinion of the International Searching Authority dated Jul. 26, 2016, 4 pages.

\* cited by examiner

FIG. 1
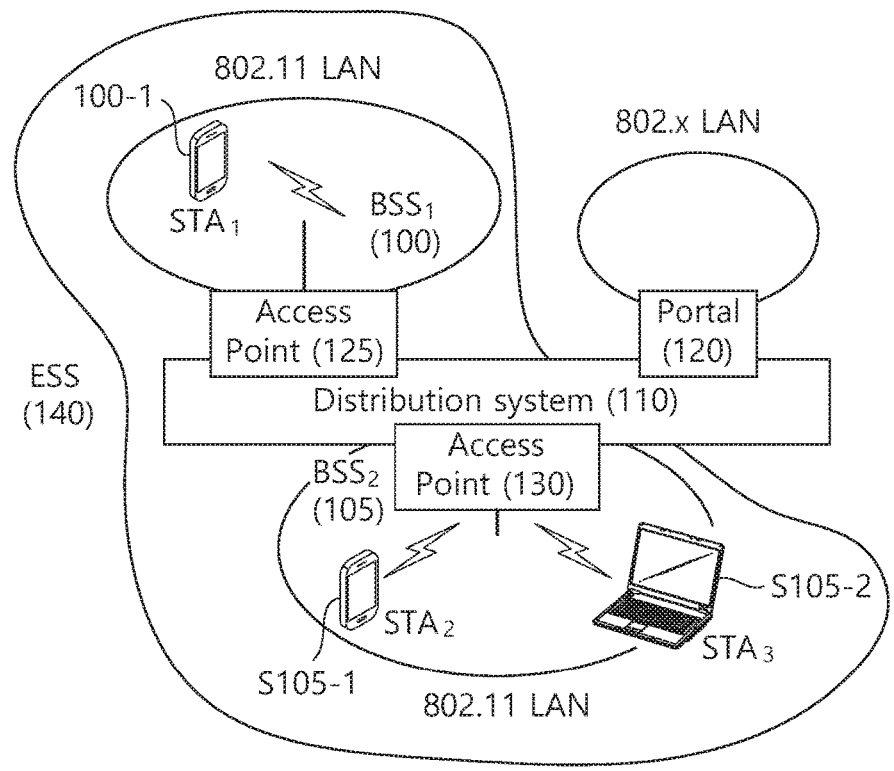
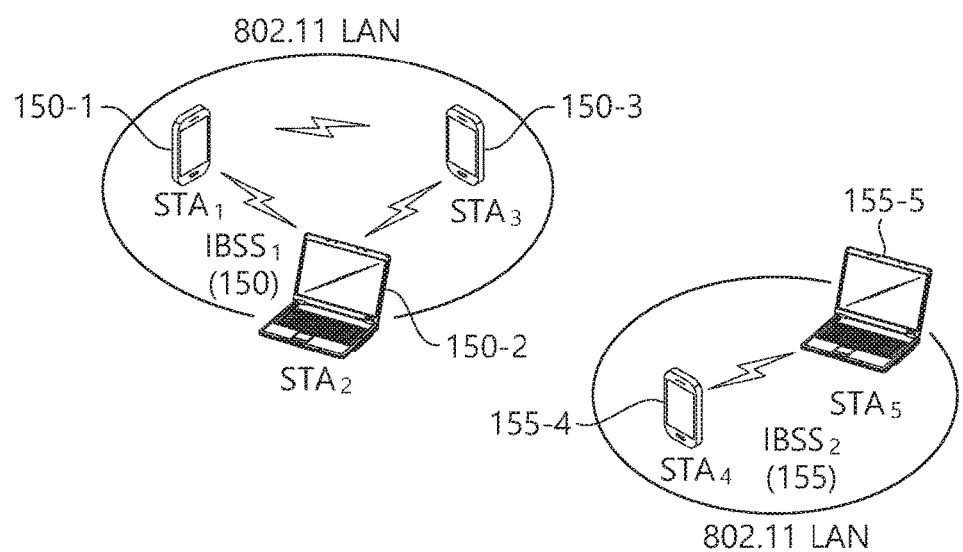

FIG. 2
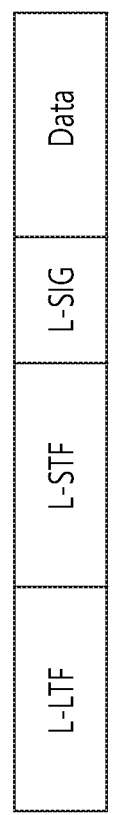
PPDU Format (IEEE 802.11a/g)
HT PPDU Format (IEEE 802.11n)
VHT PPDU Format (IEEE 802.11ac)

METHOD AND APPARATUS FOR CONFIGURING SIGNAL FIELD USED FOR MULTIPLE RESOURCE UNITS IN WIRELESS LAN SYSTEM

CROSS-REFERENCE TO RELATED APPLICATIONS

This application is the National Stage filing under 35 U.S.C. 371 of International Application No. PCT/KR2016/003875, filed on Apr. 14, 2016, which claims the benefit of U.S. Provisional Application No. 62/146,986, filed on Apr. 14, 2015, 62/147,607, filed on Apr. 15, 2015, 62/148,751, filed on Apr. 17, 2015, 62/152,041, filed on Apr. 24, 2015, and 62/154,129, filed on Apr. 29, 2015, the contents of which are all hereby incorporated by reference herein in their entirety.

BACKGROUND OF THE INVENTION

Field of the Invention

The present invention relates to a method for configuring a signal field in wireless communication and, most particularly, to a method and apparatus for configuring a signal field used for allocating multiple resource units in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

This specification proposes a method for efficiently delivering information on resource units in a wireless LAN system that uses both OFDMA scheme and MU-MIMO scheme.

Also, this specification proposes a method for reducing a total size of signaling bits, in case diverse resource units are being used.

Furthermore, in case part of a frequency band is not used, this specification proposes a method for reducing signaling bits that are related to a method for signaling this.

Technical Solutions

This specification proposes a method for transmitting a signal including control information in a wireless LAN system.

A first signal field may be configured by the transmitting station according to this specification.

Additionally, a second signal field indicating allocation information on a plurality of resource units included a first resource unit (RU) and a second resource unit (RU) may be configured, wherein a number of tones corresponding to the first resource unit (RU) may be configured to be larger than a number of tones corresponding to the second resource unit (RU).

Additionally, a physical layer protocol data unit (PPDU) including the first signal field, the second signal field, and a data field may be transmitted by the transmitting station.

In this case, the first signal field may include information for demodulating the second signal field.

Furthermore, the second signal field may include bitmap information related to a resource unit (RU) being positioned in units of the first resource unit (RU) within an entire band, MU-MIMO indication information indicating whether or not part of the band, among the entire band, is allocated for a plurality of receiving stations through a MU-MIMO scheme, and second resource unit allocation information indicating in units of the second resource unit (RU) remaining resource units excluding the resource unit (RU) being indicated by the bitmap information.

Effects of the Invention

The method according to this specification may efficiently deliver information on resource units in a wireless LAN system that uses both OFDMA scheme and MU-MIMO scheme.

Also, an example according to this specification may reduce a total size of signaling bits, in case diverse resource units are being used.

Furthermore, in case part of a frequency band is not used, an example according to this specification may reduce signaling bits that are related to a method for signaling this.

BRIEF DESCRIPTION OF THE DRAWINGS

FIG. 1 is a conceptual view illustrating the structure of a wireless local area network (WLAN).

FIG. 2 is a diagram illustrating an example of a PPDU used in an IEEE standard.

DESCRIPTION OF EXEMPLARY EMBODIMENTS

Figure 3:
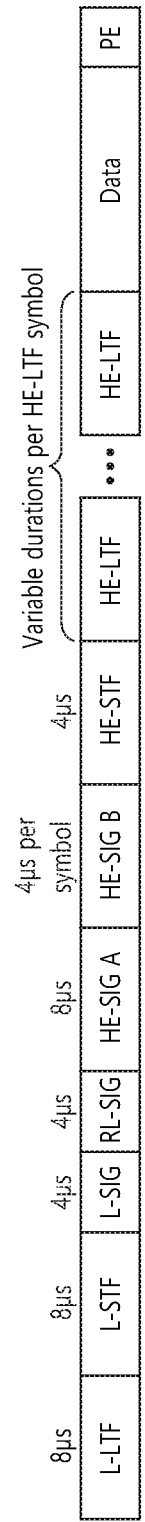
FIG. 3 is a diagram illustrating an example of an HE PDDU.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-ISG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs). More detailed description of the respective fields of FIG. 3 will be made below.

Figure 4:
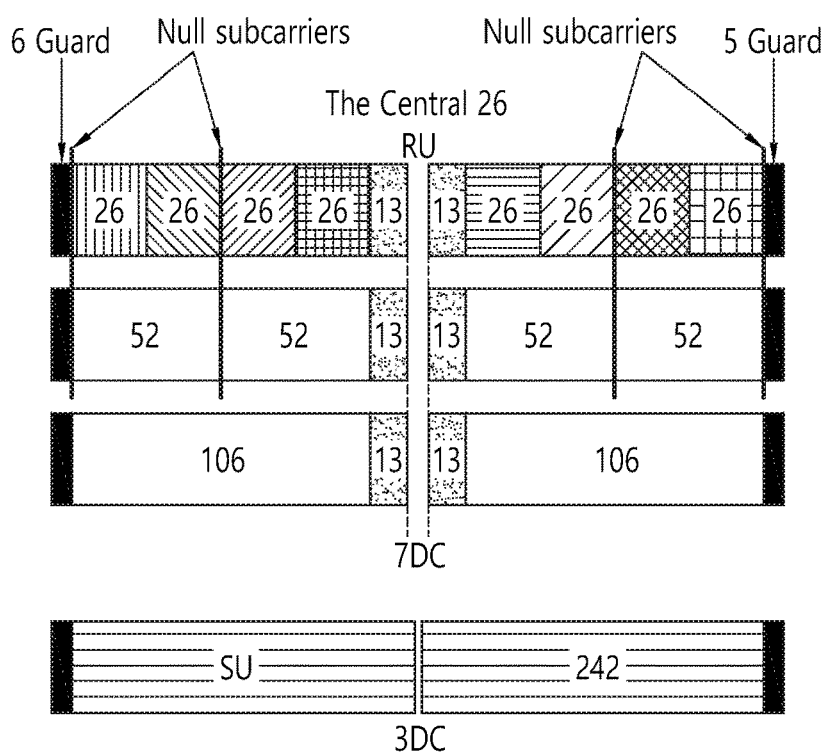
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
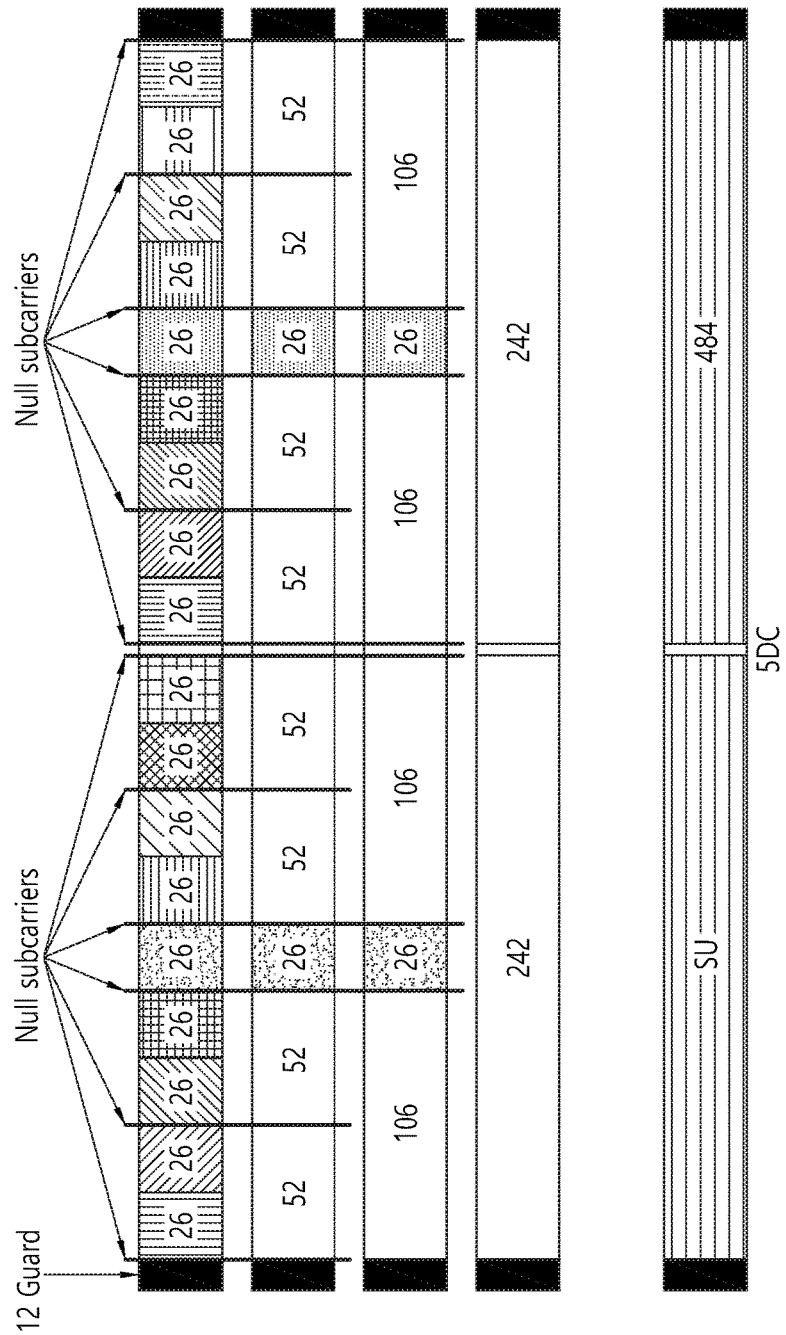
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
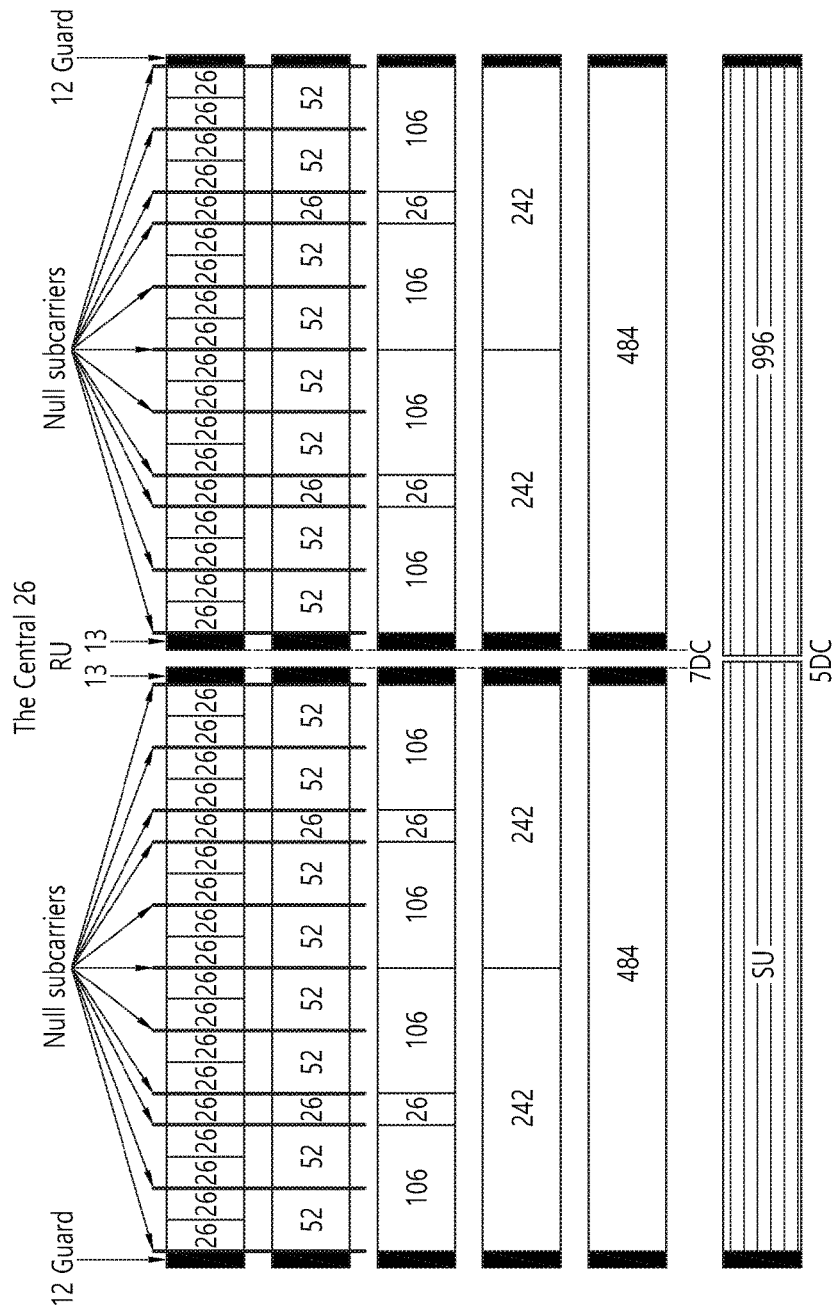
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
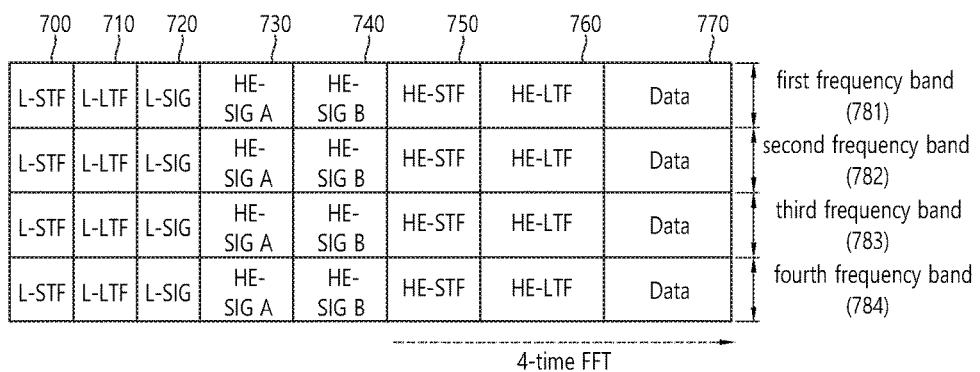
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
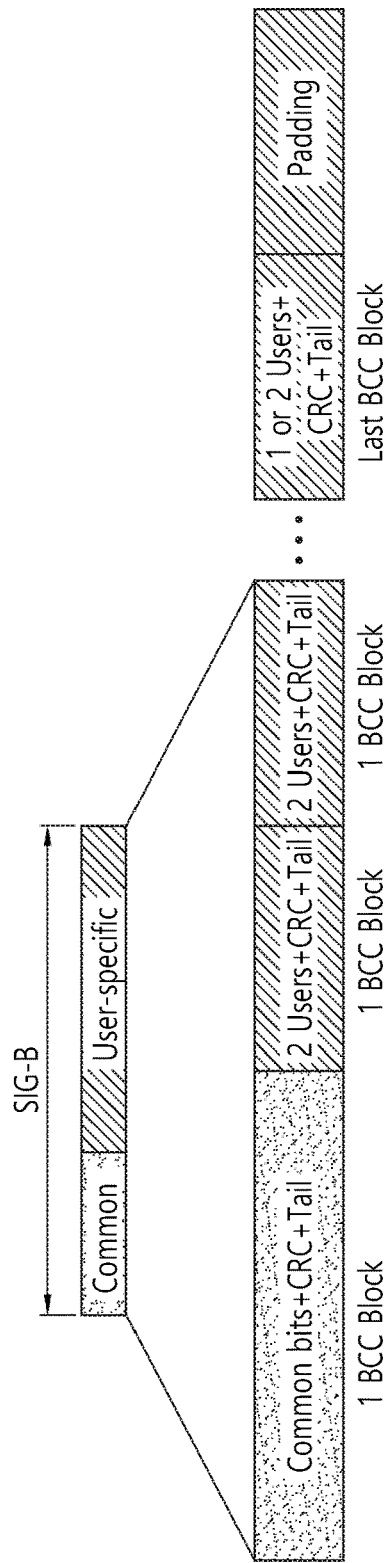
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (1-1-T) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 1-1-T/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For easy description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

The example that will hereinafter be described relates to a method for configuring a control signal in the above-described wireless LAN system (e.g., a system being supported with an OFDMA technique and/or an IEEE 802.11ax system). For example, the example that will hereinafter be described proposes an example for enhancing a first field (e.g., HE-SIG-A field) and/or a second field (e.g., HE-SIG-B field) of the wireless LAN system.

Additionally, the example that will hereinafter be described relates to a method for signaling an alignment (or positioning) of resource units (RUs) according to FIG. 4 to FIG. 6.

For example, in the following example presented below, the 242-RU shown in FIG. 4 to FIG. 6 may be referred to as a first resource unit (RU), the 26-RU may be referred to as a second resource unit (RU), and the 106-RU may be referred to as a third resource unit (RU). Although the number of tones included in each resource unit is presented to be equal to 242, 26, 106, and so on. However, the exemplary embodiment of the present invention will not be limited only to the detailed numeric values presented above.

Figure 9:
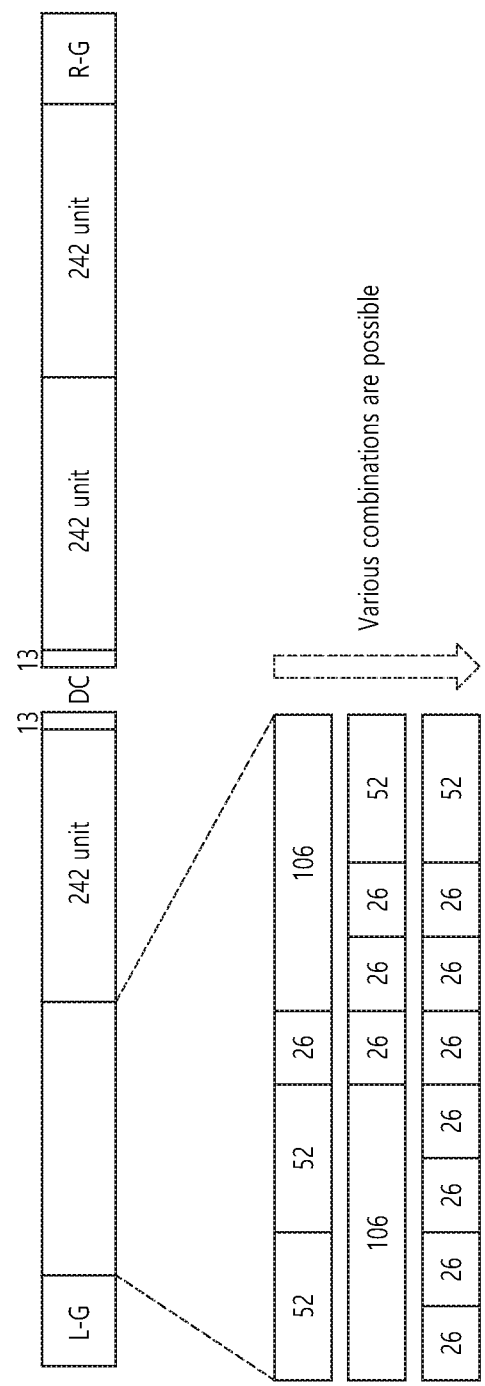
FIG. 9 illustrates an exemplary layout of diverse resource units (RUs) within the 80 MHz bandwidth.

FIG. 9 illustrates an exemplary layout of diverse resource units (RUs) within the 80 MHz bandwidth. The example shown in FIG. 9 corresponds to the alignment (or layout) of the resource units shown in FIG. 6. For simplicity in the description, detailed positions of leftover tones will not be indicated in the example shown in FIG. 9.

As shown in FIG. 9, the 80 MHz band may be aligned (or positioned) through four frequency chunks. In this case, the 242-RU (e.g., 242 units) may be positioned to second to fourth frequency chunks, and, instead, as shown in the drawing, 26-RU, 52-RU, and 106-RU may be diversely positioned in a first frequency chunk.

In the RUs are positioned as shown in FIG. 9, each RU is required to be adequately signaled to the receiving station. The allocation information corresponding to each RU may be included in the first signal field (e.g., HE-SIG-A) and/or the second signal field (e.g., HE-SIG-B).

A plurality of bits is required for signaling the positioning (or alignment) of the RUs, as shown in FIG. 9, to the first/second signal fields. However, in case of the frequency chunks corresponding to the second to fourth frequency chunks, the relatively wide frequency band may become an issue. Nevertheless, since only three 242-RUs are allocated, signaling may be performed through a relatively simple method.

However, in case of the first frequency chunk, since 26-RU, 52-RU, and 106-RU are diversely associated (or combined) despite its relatively narrow frequency band, this may become a complicated issue for configuring a detailed field.

The problematic issue shown in FIG. 9 may be resolved by simply adjusting (or rearranging) the signaling order related to the RU allocation. More specifically, this problem may be resolved by performing signaling of the larger RU (e.g., 242-RU or first RU) firsthand and then performing signaling of the remaining RUs (relatively smaller RUs or second RU) afterwards. In other words, by dividing the signaling process into a signaling process configured of relatively larger RUs and a signaling process configured of relatively smaller RUs, signaling overhead may be reduced.

Figure 10:
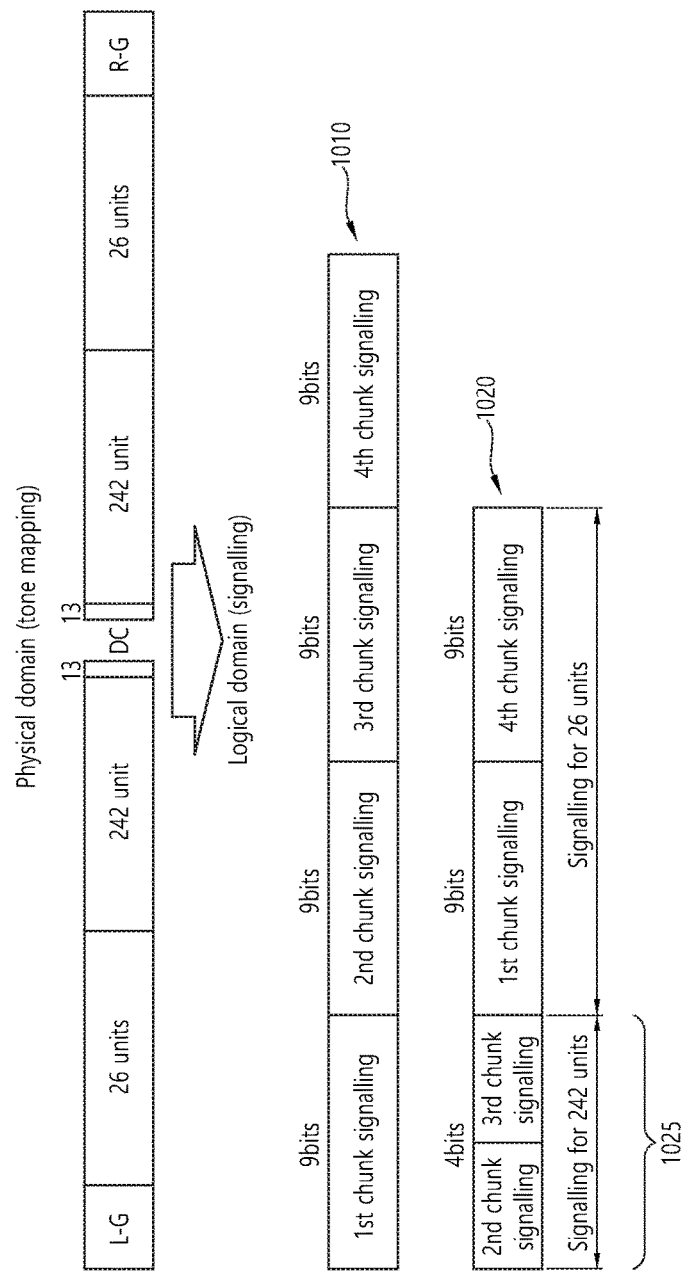
FIG. 10 illustrates an example of adjusting an order for signaling RU allocation.

FIG. 10 illustrates an example of adjusting an order for signaling RU allocation.

The details shown on an upper part of FIG. 10 indicate actual tone mapping within the 80 MHz band. More specifically, this is a simplified version of the RU layout (or positioning) shown in FIG. 6, and, for simplicity in the description, null sub-carriers are not illustrated herein.

The region shown in FIG. 10 corresponds to an exemplary region, wherein two frequency chunks are used at a left side of the DC tone, and wherein two frequency chunks are used at a right side of the DC tones, and, herein one frequency chunk may correspond to a 242-RU (or a combination of other RUs). Hereinafter, for simplicity in the description, the related tone mapping/signaling will be described without considering the 26-RU using 13 tones at both left and right sides of the DC tone.

As shown in the drawing, based on a physical domain, two 242-units (i.e., 242-RUs) may be positioned near the DC band. In this case, signaling may be configured by using diverse methods in the logical domain.

Firstly. As shown in the first method 1010, 9-bit signaling may be used for each of the four frequency chunks. More specifically, as shown in FIG. 6, since nine 26-RUs may be positioned for each frequency chunk, when using a bitmap configured of 9 bits, the RU positioning for one frequency chunk may be completely (or fully) signaled. In other words, in order to configure signaling in 26-RU units, 9 bits are required. Accordingly, the first method 1010 proposes a 9-bit signaling for each of the four frequency chunks.

However, the first method 1010 has a problem of causing an increase in the first method 1010. In order to resolve this problem, a second method 1020 is proposed. The second method 1020 proposes that, in case a relatively large RU (i.e., 242-RU) is allocated, signaling for the corresponding RU is positioned (or allocated) with a higher priority, and allocation information corresponding to a relatively small RU (i.e., 26-RU) is positioned (or allocated) afterwards. When generalizing this proposal, the second method 1020 corresponds to an ordering method according to the RU size, which relates to positioning signaling by dividing the signaling process into signaling configured a relatively large RU and signaling configured of a relatively small RU. It is preferable that information on the ordered signaling is included in the first and/or second signaling field(s). If the corresponding information is included in the first signaling field, the corresponding information may be included in a common field, as shown in FIG. 8, or may be included in a user-specific field.

In case ordering is applied as shown in the second method 1020, the bit size of the signaling information 1025 for the large RU (i.e., 242-RU) may be reduced. More specifically, as shown in FIG. 10, the 242-RU may be signaled by using a 4-bit signaling.

Additionally, although the second method 1020 shown in FIG. 10 discloses an example of configuring 9-bit signaling for each of the first chunk and the fourth chunk, the number of bits used in the corresponding 9-bit signaling may be further reduced by using a look-up table or a flipped bit, which will be described later on.

The example shown in FIG. 10 may be described differently as presented below.

According to the example shown in FIG. 4 to FIG. 6, 26-RU, 52-RU, 106-RU, 242-RU, 484-RU, and so on, may be used. These may be divided into signaling for 242-RU and 484-RU and signaling for 26-RU, 52-RU, and 106-RU.

And, 242-RU and 484-RU configure the signaling in 242-RU units (e.g., configure a bitmap), and 26-RU, 52-RU, and 106-RU configure the signaling in 26-RU units (e.g., configure the signaling by using a bitmap, a look-up table, and a flipped bit method). Additionally, the signaling configured in 242-RU units may be positioned, for example, in the first/second signaling field(s) with a higher priority, and the signaling configured in 26-RU units may be positioned afterwards.

The signaling configured in 242-RU units may, for example, correspond to a bitmap structure. More specifically, in case the 20 MHz band becomes an issue, the signaling may correspond to a 1-bit bitmap, and, in case each of the 40 MHz band and the 80 MHz band becomes an issue, the signaling may respectively correspond to a 2-bit bitmap and a 4-bit bitmap. Thus, a complete signaling may be performed. If a non-contiguous channel binding is to be considered, additional variation may be required. A detailed description of the same will be provided later on.

The signaling configured in 26-RU units may, for example, be implemented by using bitmaps, which are described above in FIG. 10, or by using methods, such as a look-up table, a flipped bit, and so on, which will hereinafter be described in detail.

Hereinafter, detailed examples of methods, such as a look-up table, a flipped bit, and so on, which can be used for the signaling configured in 26-RU units, will be described.

Hereinafter, for simplicity in the description, in case the total band is equal to 40 MHz, a case when a total number of four users (i.e., receiving stations that can be implemented as APs or non-APs) become a problematic issue will be described, and, in this description, an example of configuring signaling in 242-RU units for one user and configuring signaling in 26-RU units for the remaining three users will be introduced. Also, 242-RU unit signaling is allocated to the first frequency chunk (e.g., the left-side frequency chunk of the DC band within the 40 MHz), and 26-RU unit signaling is used for the second frequency chunk (e.g., the right-side frequency chunk of the DC band within the 40 MHz). Most particularly, in the first frequency chunk, a 242-RU is allocated to a first user, and, in the second frequency chunk, a 26-RU is allocated to a second user, a 106-RU is allocated to a third user, and another 106-RU is allocated to a fourth user.

Firstly, an exemplary method performed by using a look-up table may be as described below. Hereinafter, this method may be indicated as a "Joint signaling with using a flipped bit per user".

A detailed example of a predetermined look-up table configured in the transmitting/receiving end(s) may be as shown below in Table 1.

TABLE 1

| Index | Total number of allocated units | 26-RU | 52-RU | 106-RU |
| --- | --- | --- | --- | --- |
| 0 | 2 | 0 | 0 | 2 |
| 1 | 3 | 1 | 0 | 2 |
| 2 | 4 | 1 | 2 | 1 |
| 3 | 5 | 3 | 1 | 1 |
| 4 | 5 | 1 | 4 | 0 |
| 5 | 6 | 5 | 0 | 1 |
| 6 | 6 | 3 | 3 | 0 |
| 7 | 7 | 5 | 2 | 0 |
| 8 | 8 | 7 | 1 | 0 |
| 9 | 9 | 9 | 0 | 0 |

As described above, since the 40 MHz band is problematic, and since 242-RU is allocated to the first frequency chunk, the signaling for the RU being allocated in 242-RU units is configured as "10", and the signaling for the RU being allocated in 26-RU units (i.e., one 26-RU and two 106-RUs) corresponds to index "1", which is indicated in Table 1. More specifically, the entire signaling may be implemented as "10 0001", and such entire signaling may be included in the first and/or second signal field(s). More specifically, the entire signaling may be included in a common field and/or a user-specific field of the second signal field (e.g., HE-SIG-B field).

Secondly, an exemplary method performed by using a flipped bit may be as described below. Hereinafter, this method may be indicated as a "Joint signaling with using a flipped bit per user".

Herein, the signaling for the RU allocated in 242-RU units being configured as "10" remains unchanged. However, the signaling being configured in 26-RU units is configured of 9 bits, and this signaling is determined based on the actual allocated positions of 106-RU, 26-RU, 106-RU. More specifically, referring to the RU layout shown in FIG. 5, the positioning order may be 106-RU, 26-RU, 106-RU, and, in this case, the 106-RU corresponds to four 26-RUs. Accordingly, information indicating that the 106-RU has been allocated is indicated through "1111", and, afterwards, information indicating that the 26-RU has been allocated is indicated through a flipped bit "0", and, then, information indicating that the 106-RU has been allocated is indicated by repeating a flipped bit "1" four times. In this case, the flipped bit may be implemented as "1111 0 1111", and depending upon the detailed allocation positions of the 26-RU and the 106-RUs, the flipped bit may be implemented differently. For example, a layout of 26-RU, 106-RU, 106-RU may be signaled through "1" "0000" "1111".

The entire signaling, which is configured by adding the above-described flipped bit to a "10" bit, may be included in the first and/or second signal field(s). More specifically, the entire signaling may be included in a common field and/or a user-specific field of the second signal field (e.g., HE-SIG-B field).

Thirdly, user-specific signaling with a number of subbands may be performed. This method may be indicated as "per user signalling with # of subband".

According to the above-described premise, since the 242-RU is allocated to the first user, the corresponding signaling is configured of "10", as described above. And, since the 26-RU is allocated to the second user, this corresponds to a concept of allocating one subband (i.e., 26 tones) to the second user. Accordingly, "0001" may be signaled. And, since 106-RU is allocated to the third/fourth users, "0100" may be signaled to four subbands.

As a result, the entire signaling may be implemented as "10 0001 0100 0100".

The third method may be additionally modified for an additional decrease in the number of bits. For example, since the 242-RU is allocated to the first user, the corresponding signaling is configured of "10", as described above. Meanwhile, since three different types of RUs corresponding to 26-RU, 52-RU, 106-RU may be used, this may be indicated through a 2-bit signaling. Most particularly, in order to indicate information that 26-RU, which corresponds to a first RU type, is being allocated to the second user, "00" may be signaled. Also, in order to indicate information that 106-RU, which corresponds to a third RU type, is being allocated to the third/fourth users, "10" may be signaled. In this case, the entire signaling may be implemented as "10 00 10 10".

Such entire signaling may be included in the first and/or second signal field(s). More specifically, the entire signaling may be included in a common field and/or a user-specific field of the second signal field (e.g., HE-SIG-B field).

In summary, bit information related to the resource unit (e.g., 242-RU being allocated to the second/third frequency chunks shown in FIG. 10), which is allocated in first resource unit (RU) units (e.g., 242-RU units) within the entire band, may be provided through the second signal field. An example of the bitmap information may correspond to the above-described '10' bit. In other words, the bitmap information indicates whether or not the 242-RU (or RU having a larger size) is being positioned within the entire band. More specifically, the bitmap information indicates the allocation information on the 242-RU (or RU having a larger size) within the entire band.

Additionally, the second field may additionally include second resource unit allocation information, which indicates the remaining resource units (RUs) excluding the resource units being indicated by the bitmap information (e.g., 26-RU/52-RU/106-RU being allocated to the first/fourth frequency chunks as shown in FIG. 10), in the second resource unit (RU) units. As described above, the second resource unit allocation information may be indicated by using a look-up table, a flipped bit, number of corresponding subbands, and so on. In other words, the second resource unit allocation information is used for indicating the remaining resource units (RUs) excluding the resource units being indicated by the bitmap information (e.g., 26-RU, 52-RU, and 106-RU). More specifically, the second resource unit allocation information indicates information on whether or not at least any one of 26-RU, 52-RU, and 106-RU is being positioned within the entire band, in 26-RU units. In other words, the second resource unit allocation information indicates allocation information on 26-RU, 52-RU, and 106-RU within the entire band.

Meanwhile, it is preferable that the second signal field additionally includes MU-MIMO indication information. More specifically, the MU-MIMO indication information may be implemented in a bitmap format, and so on, and the MU-MIMO indication information may indicate whether or not a partial band of the entire band is allocated for multiple receiving stations by using the MU-MIMO scheme (i.e., whether or not the MU-MIMO scheme is being applied for a specific RU in addition to the OFDMA). More specifically, information indicating in which RU the MU-MIMO scheme is being applied may be indicated through the MU-MIMO indication information.

A detailed description of the MU-MIMO indication information is as presented below.

As described above, the MU-MIMO scheme may be applied to the wireless LAN system applying the exemplary embodiment of the present invention in addition to the OFDMA for downlink and/or uplink.

A first example of the MU-MIMO indication information according to the exemplary embodiment of the present invention may indicate whether or not the MU-MIMO scheme is applied (in addition to the OFDMA) for 242-RU or a specific RU having a size larger than 242-RU.

The signaling field indicating whether or not the MU-MIMO scheme is applied for 242-RU or a specific RU having a size larger than 242-RU may be implemented by only including additional bitmap information. More specifically, the MU-MIMO indication information may be implemented similarly as the above-described bitmap information (i.e., bitmap performing signaling in 242-RU units). Most particularly, the MU-MIMO indication information may also indicate for which 242-RU the MU-MIMO scheme is being applied through 1, 2, and 4 bitmaps corresponding to each of 20 MHz, 40 MHz, and 80 MHz.

Additionally, the MU-MIMO indication information may also indicate a number of MU-MIMO users corresponding to each frequency chunk (i.e., frequency chunk corresponding to 242-RU). For example, the MU-MIMO indication information may indicate 2 or 4 users through 1-bit information and may also indicate 2, 3, and 4 users through 2-bit information.

Meanwhile, the MU-MIMO indication information may also use parameters including all fields indicating the bitmap information and the number of MU-MIMO users. For example, by using 2 bits, the "00" value may indicate a SU scheme (i.e., a scheme for allocating one user for a specific RU), the "01" value may indicate the usage of the MU-MIMO scheme and 2 users, the "10" value may indicate the usage of the MU-MIMO scheme and 3 users, and the "11" value may indicate the usage of the MU-MIMO scheme and 4 users. In the above-described example, the detailed number of users is variable.

Instead of the MU-MIMO indication information, the application of the MU-MIMO may also be indicated by using a method of inserting a GID in a predetermined field (first/second signal fields or other control field). More specifically, the system may be implemented so that a GID can be first inserted in a predetermined field and an AID can be inserted afterwards. Herein, in case the GID is inserted, the MU-MIMO scheme may be applied for the MU-MIMO users corresponding to the inserted GID, and a SU-MIMO scheme may be applied for the users corresponding to the AID. Which is inserted afterwards. More specifically, the MU-MIMO indication information may be replaced by using a GID/AID, which is similar to implementing the MU-MIMO indication information by using the above-described bitmap method. In this case, the number of MU-MIMO users may be indicated, and, as described above, the number of users corresponding to each chunk may also be indicated by using 1-bit information or 2-bit information.

Hereinafter, a second example that can be performed in addition to or as a replacement of the first example of the MU-MIMO indication information will be described in detail. More specifically, in the above-described example, an example of applying the MU-MIMO (in addition to the OFDMA) for a 242-RU or a specific RU having a size larger than 242-RU was presented. The second example, which is applied in addition to or as a replacement of the above-described example, relates to a MU-MIMO scheme for a 106-RU.

For flexibility in the number of users and scheduling that can be supported through MU-MIMO, the MU-MIMO scheme may also be applied for the 106-RU. In this case, the MU-MIMO scheme may be applied for the 106-RU regardless of the entire band size, or the size of the RU to which the MU-MIMO is applied may be varied in accordance with the size of the entire band. For example, in case of a 40 MHz band or a band having a larger size, the MU-MIMO may be applied only for 242-RUs or RUs having a larger size, and, in case of a 20 MHz band, the MU-MIMO scheme may be applied for 106-RUs.

In case of indicating the MU-MIMO scheme also for the 106-RU, the bitmap being included in the MU-MIMO indication information according to the exemplary embodiment of the present invention may have a meaning that varies from the meaning of the above-described first example. More specifically, in this case, it may be interpreted that the MU-MIMO scheme is applied for at least one 106-RU being included in the corresponding frequency chunk and not that the MU-MIMO scheme is applied to the entire 242-RU.

In case the MU-MIMO scheme can be applied for at least one 106-RU within a specific chunk, it is preferable that signaling for the RU (i.e., 106-RU) having the MU-MIMO scheme applied thereto is applied at a higher priority and that signaling for other RUs having SU-MIMO (i.e., SU-OFDMA) applied thereto is applied afterwards.

Furthermore, information indicating the number of 106-RUs being targeted for the MU-MIMO scheme included in the bitmap within the MU-MIMO indication information, or information indicating to which RU the corresponding 106-RU corresponds may be added, and, for this, an integrated information field indicating the presence or absence of the MU-MIMO scheme and indicating 106-RU allocation information at the same time may be implemented. For example, the presence or absence of the MU-MIMO scheme and the 106-RU allocation information may be indicated by using 2-bit information. Herein, among the corresponding 2-bit field, one bit may indicate whether or not the MU-MIMO scheme is applied to the corresponding 242 chunk, and the remaining one bit may indicate the number of 106-RUs being targeted for the MU-MIMO scheme (e.g., one 106-RU or two 106-RUs may be indicated through the 1-bit information) or may indicate to which RU the corresponding 106-RU corresponds (more specifically, since there are only 2 positions where the 106-RU may be located within the 242 chunk, as shown in FIG. 5, FIG. 6, and so on, this information is indicated through the 1-bit information). Alternatively, a 3-bit field may also be used. More specifically, among the 3-bit field, one bit may be used for indicating whether or not the MU-MIMO scheme is applied to the corresponding 242 chunk, and the remaining 2 bits may be used for indicating the 106-RU (e.g., may use a bitmap, and so on).

In this case, information on a number of users being multiplexed by the MU-MIMO scheme may be included in a predetermined control field (e.g., HE-SIG-A field and/or HE-SIG-B field).

Although the description presented above includes the example of indicating the MU-MIMO scheme for the 106-RU, even if the MU-MIMO scheme is actually applied only for the 242-RU, since the maximum number of users available for support is sufficient, it is possible for the exemplary embodiment of the present invention to user any one of the above-described first method and/or the second method.

Table 2 shown below indicates a maximum number of users that are available for support in case of applying the MU-MIMO scheme for the 242-RU.

Table 2 relates to a case when the maximum number of users is assumed to be equal to 18. According to Table 2, in case 20 MHz/40 MHz/80 MHz bands are used while using 0 242-RU (when a RU having a size that is smaller than the 242-RU is used), 9 users, 18 users, and 18 users may be respectively supported.

The values indicated in parentheses indicate the number of users according to the MU-MIMO scheme. For example, even if one 242-RU unit is used, in the 20 MHz band, 4 users may be supported by the MU-MIMO scheme, and, in case of other bands, even though the number of users that can be supported in accordance with the 242-RU may be reduced, the number of supportable users that are added due to the MU-MIMO scheme cancels the reduction in the number of supportable users. Accordingly, it will be understood that it is possible to choose to apply the MU-MIMO scheme only for the 242-RU (or an RU having a larger size).

TABLE 2

| Number of 242-RUs used | 20 MHz | 40 MHz | 80 MHz |
|---|---|---|---|
| 0 | 9 (0) | 18 (0) | 18 (0) |
| 1 | 4 (4) | 13 (4) | 18 (4) |
| 2 | N/A | 8 (8) | 18 (8) |
| 3 | N/A | N/A | 18 (12) |
| 4 | N/A | N/A | 17 (16) |

Meanwhile, the above-described bitmap information (bitmap indicating allocation information for 242-RU, which is positioned within the entire band) may be additionally varied (or modified) in a system supporting non-contiguous channel bonding.

As described above, according to the related art multi-channel allocation method, a non-contiguous channel was not allocated. More specifically, in the related art method, even though the primary channel rule was used for allocating a wide bandwidth to the receiving station, restrictions (or constraints) related to this existed. More specifically, according to the related art rule, in case a secondary channel being adjacent to the primary channel was used in an overlapped BSS (OBSS) and was, therefore, 'busy', the STA was incapable of using the remaining channels excluding the primary channel.

Figure 11:
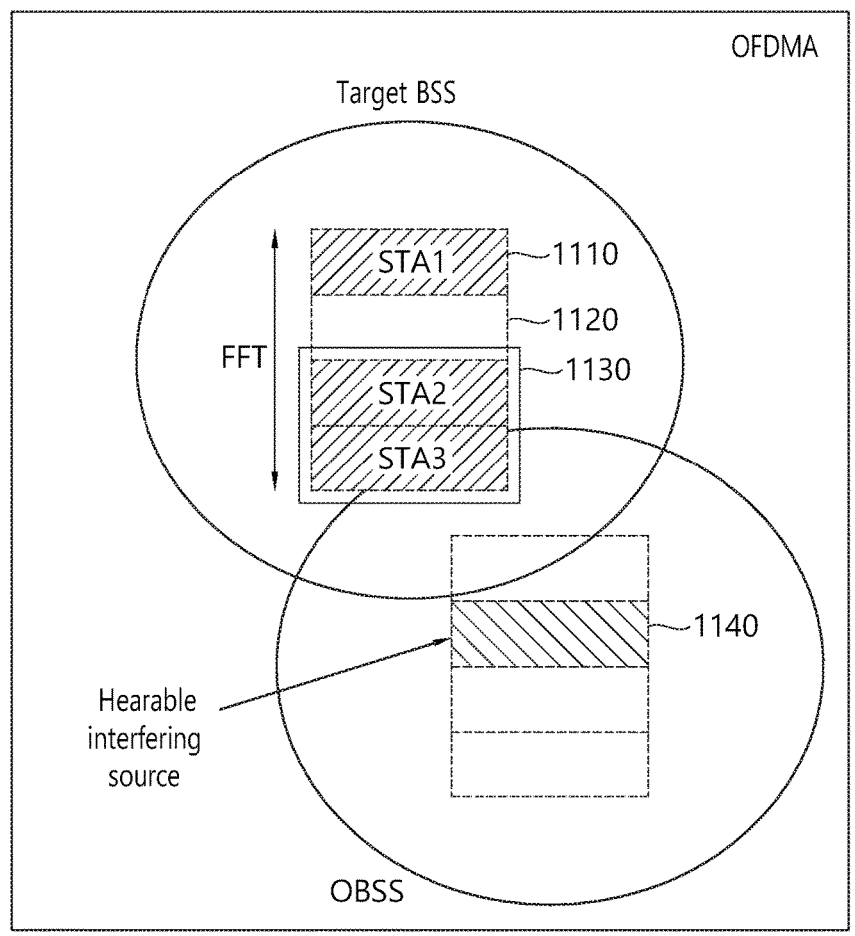
FIG. 11 is an exemplary situation where the related art primary channel rule may become a problematic issue.

FIG. 11 is an exemplary situation where the related art primary channel rule may become a problematic issue.

As described above, according to the related art rule, in case a secondary channel 1120, which is adjacent to a primary channel 1110 was 'busy' due to its usage in an OBSS, a transmitting end was incapable of using the remaining channels 1130 excluding the primary channel 1110. However, in case non-contiguous channel bonding is authorized, the transmitting end may use the remaining channels 1130 excluding the primary channel 1110. In this case, the above-described bitmap information may be varied (or modified) as described below.

Basically, the non-contiguous channel bonding may be performed in 20 MHz units. More specifically, as shown in FIG. 11, frequency may be allocated so that a band 1120 corresponding to 20 MHz becomes non-contiguous. For the non-contiguously process band 1120, some (or part) of the fields or all fields included in the PPDU, shown in FIG. 7, may be omitted. For example, only the data field may be included and the control fields preceding the data field that may be omitted, or only some of the control fields may be included.

In case non-contiguous channel bonding is performed, information on the corresponding non-contiguous channel (e.g., at least one 20 MHz channel) may be signaled through a first signal field (e.g., HE-SIG-A). More specifically, a non-contiguous channel may be indicated (e.g., indicated by using a bitmap) by a specific field (e.g., OFDMA channel configuration field) of the first signal field. In case a bitmap is used in the 80 MHz band, the OFDMA channel configuration field, which is configured of "1 0 1 1", may indicate that a second frequency band is not used and that the remaining first, third, and fourth frequency bands are used. The first to fourth frequency bands may respectively correspond the first to fourth frequency chunks shown in FIG. 10. More specifically, information indicating that a channel corresponding to the second frequency chunk is no longer being used may be signaled through the first signal field.

In this case, even if the 80 MHz band is said to be problematic, the above-described bitmap information (i.e., 242-RU bitmap) is not required to be a 4-bit bitmap. More specifically, since the second frequency chunk is not being used, even if the bitmap corresponds to a 3-bit bitmap, the allocation information for the 242-RU may be completely (or fully) signaled.

As a similar example, in case "1 0 0 1" is signaled through the OFDMA channel configuration field, since the second/third frequency chunks are not being used, even if the bitmap corresponds to a 2-bit bitmap, the allocation information for the 242-RU may be completely (or fully) signaled.

More specifically, in case the non-contiguous channel is used, the size of the bitmap information related to the 242-RU may be reduced.

Meanwhile, in case the above-described specific field (e.g., OFDMA channel configuration field) is proposed through the first signal field (e.g., HE-SIG-A), the number of bits of the OFDMA channel configured field may be reduced. More specifically, in case the OFDMA channel configuration field is configured as a bitmap, among each of the 20 MHz bands, a separate indication bit is not required to be configured for the primary channel. In other words, since the primary channel corresponds to a channel that is indicated by a beacon, and since the 20 MHz channel is always used even if the non-contiguous channel is used, a bit indicating whether or not the corresponding channel is used is not required to be configured.

In case the information on the primary channel is omitted from the first signal field, the above-described bitmap information should be implemented based on the description presented above.

For example, in case the OFDMA channel configuration field indicates "1 0 1", apart from the first frequency chunk, which corresponds to the primary channel, this indicates that the second and fourth frequency chunks are used. Accordingly, even if the OFDMA channel configuration field of the first signal field is configured of 3 bits, instead of being configured of 2 bits, the bitmap information (i.e., 242-RU bitmap) should be configured of 3 bits for indicating the allocation information of the 242-RU within the 3 frequency chunks that are used (i.e., first, second, and fourth frequency chunks).

As a similar example, in case the OFDMA channel configuration field indicates "1 1 1", apart from the first frequency chunk, which corresponds to the primary channel, this indicates that the remaining second to fourth frequency chunks are all used. Accordingly, even if the OFDMA channel configuration field of the first signal field is configured of 3 bits, instead of being configured of 3 bits, the bitmap information (i.e., 242-RU bitmap) should be configured of 4 bits for indicating the allocation information of the 242-RU within the 4 frequency chunks that are used (i.e., first to fourth frequency chunks).

Figure 12:
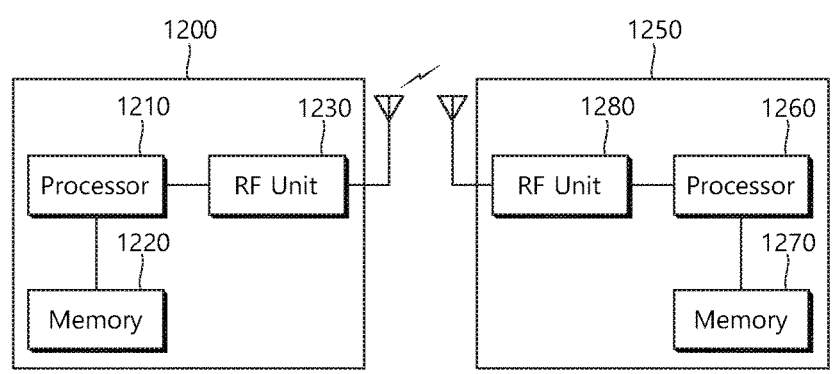
FIG. 12 is a block view illustrating a wireless device to which the exemplary embodiment of the present invention can be applied.

FIG. 12 is a block view illustrating a wireless device to which the exemplary embodiment of the present invention can be applied.

Referring to FIG. 12, as an STA that can implement the above-described exemplary embodiment, the wireless device may correspond to an AP 1200 or a non-AP station. The wireless device may correspond to the above-described user or may correspond to a transmitting device/transmitting station transmitting signals to the user.

The AP 1200 includes a processor 1210, a memory 1220, and a radio frequency (RF) unit 1230.

The RF unit 1230 is connected to the processor 1210, thereby being capable of transmitting and/or receiving radio signals.

The processor 1210 implements the functions, processes, and/or methods proposed in the present invention. For example, the processor 1210 may perform the operations of the AP according to the above-described exemplary embodiments of the present invention. More specifically, among the operations that are disclosed in the exemplary embodiments of FIG. 1 to FIG. 11, the processor 1210 may perform the operations that may be performed by the AP.

The non-AP STA 1250 includes a processor 1260, a memory 1270, and a radio frequency (RF) unit 1280.

The RF unit 1280 is connected to the processor 1260, thereby being capable of transmitting and/or receiving radio signals.

The processor 1260 implements the functions, processes, and/or methods proposed in the present invention. For example, the processor 1260 may be implemented to perform the operations of the non-AP STA according to the above-described exemplary embodiments of the present invention. The processor may perform the operations of the non-AP STA, which are disclosed in the exemplary embodiments of FIG. 1 to FIG. 11.

The processor 1210 and 1260 may include an application-specific integrated circuit (ASIC), another chip set, a logical circuit, a data processing device, and/or a converter converting a baseband signal and a radio signal to and from one another. The memory 1220 and 1270 may include a read-only memory (ROM), a random access memory (RAM), a flash memory, a memory card, a storage medium, and/or another storage device. The RF unit 1230 and 1280 may include one or more antennas transmitting and/or receiving radio signals.

When the exemplary embodiment is implemented as software, the above-described method may be implemented as a module (process, function, and so on) performing the above-described functions. The module may be stored in the memory 1220 and 1270 and may be executed by the processor 1210 and 1260. The memory 1220 and 1270 may be located inside or outside of the processor 1210 and 1260 and may be connected to the processor 1210 and 1260 through a diversity of well-known means.

What is claimed is:

1. A method for transmitting a signal including control information in a wireless LAN system, the method performed by a transmitting station and comprising:
   configuring a first signal field;
   configuring a second signal field indicating allocation information related to a plurality of resource units (RUs) including a first resource unit (RU) and a second RU; and
   transmitting a physical layer protocol data unit (PPDU) including the first signal field, the second signal field, and a data field,
   wherein a number of tones corresponding to the first RU is larger than a number of tones corresponding to the second RU,
   wherein the first signal field includes information for demodulating the second signal field, and
   wherein the second signal field includes bitmap information indicating an RU positioned in units of the first RU within an entire band, MU-MIMO indication information indicating whether part of an entire band is allocated for a plurality of receiving stations through a MU-MIMO scheme, and RU allocation information indicating in units of the second RU remaining RUs excluding the RU indicated by the bitmap information.

2. The method of claim 1, wherein the bitmap information is positioned within the second signal field with a higher priority than the allocation information.

3. The method of claim 1, wherein:
   the first RU corresponds to 242 tones;
   the second RU corresponds to 106 tones;
   the bitmap information indicates in units of 242-RU whether at least 242-RU or 484-RU is positioned within the entire band; and
   the RU allocation information indicates in units of 26-RU whether at least 26-RU, 52-RU, or 106-RU is positioned within the entire band.

4. The method of claim 1, wherein:
   the MU-MIMO scheme is allocated in units of a third RU within part of the band;
   a number of tones corresponding to the third RU is larger than a number of tones corresponding to the second RU and smaller than a number of tones corresponding to the first RU; and
   the MU-MIMO indication information indicates at least one third RU to which the MU-MIMO scheme is applied.

5. The method of claim 4, wherein:
   the first RU corresponds to 242 tones;
   the second RU corresponds to 26 tones; and
   the third RU corresponds to 106 tones.

6. The method of claim 1, wherein:
   the first signal field indicates whether each of a plurality of unit frequency bands included in the entire band is used; and
   the bitmap information further indicates bitmap information for a unit frequency band indicated for use by the first signal field.

7. The method of claim 1, wherein:
   the first signal field corresponds to a HE-SIG-A field; and
   the second signal field corresponds to a HE-SIG-B field.

* * * * *